United States Patent [19]

Murphy

[11] 3,730,455

[45] May 1, 1973

[54] FISHING REEL WITH DEPTH MEMORY

[76] Inventor: Joseph C. Murphy, 5817 East 57th Street, Tulsa, Okla.

[22] Filed: Dec. 29, 1971

[21] Appl. No.: 213,311

[52] U.S. Cl. ............................................242/84.1 L
[51] Int. Cl. ................................................A01k 89/00
[58] Field of Search ....................242/84.2 A, 84.2 R, 242/84.21 A, 84.1 L; 33/265.5, 265.6

[56] References Cited

UNITED STATES PATENTS

| 3,465,982 | 9/1969 | Coshow | 242/84.1 L |
| 3,085,765 | 4/1963 | Urich | 242/84.1 L |

Primary Examiner—Billy S. Taylor
Attorney—Irvin S. Thompson et al.

[57] ABSTRACT

A fishing reel has a line lock which, when set, permits a certain length of line to be reeled in and then that same length to be unreeled again, so that the angler can return his lure to the same depth. The lock is in the form of a pin extensible over the periphery of the spool and over which the line is rewound. The rewound line can unwind, but further unwinding is prevented by the pin. The pin has a notch which engages with fixed structure in the extended pin position. A coil compression spring urges the pin to retracted position, and this same spring is anchored at one end in such a way to serve as a leaf spring to urge the notch in the pin about the fixed structure. The notch is so positioned that, when a cast is made to a relatively great distance, the weight of the cast lure will be sufficient to raise the pin against the action of the spring until the notch is disengaged, whereupon the same spring retracts the pin and the lock is thus automatically released.

10 Claims, 6 Drawing Figures

PATENTED MAY 1 1973    3,730,455

INVENTOR.
Joseph C. Murphy
BY Young & Thompson
ATTORNEYS

FISHING REEL WITH DEPTH MEMORY

The present invention relates to fishing reels having depth memory, that is, to fishing reels having manually settable means for permitting exactly the same length of line to be paid out and retrieved, time and again, so that the angler can return his lure to the same depth as often as he wishes.

Such reels have in the past been provided with a pin that can be advanced in a direction parallel to the axis of the spool, until it overlies the periphery of the spool. The pin is advanced when the desired depth is reached; and when the line is rewound about the spool, the rewound line will overlie the pin. Upon subsequently paying out the line, the pin presents no impediment to the rewound line; but as soon as the rewound line has been paid out, the next loop of line will be disposed under the pin and will be prevented by the pin from unwinding. In this way, the angler can return his lure to the same depth as the depth at which he set the pin. Once the angler desires to fish in a different depth or to pay out a greater length of line, he has only to retract the locking pin manually, whereupon the line can be freely wound and rewound to any desired extent.

Such depth memory devices have the disadvantage, however, that they must be manually released and that the angler must remember to do so. Otherwise, should the angler for example forget to release the lock and attempt to cast at a greater distance, his cast may be aborted by the set lock, with inconvenient results.

Accordingly, it is an object of the present invention to provide a fishing reel with a depth memory in the form of a line lock, in which the lock automatically releases under certain conditions.

Another object of the present invention is the provision of such a reel, which will be relatively simple and inexpensive to manufacture, easy to operate, maintain and repair, and rugged and durable in use.

Other objects and advantages of the present invention will become apparent from a consideration of the following description, taken in connection with the accompanying drawing, in which.

Figure 3:
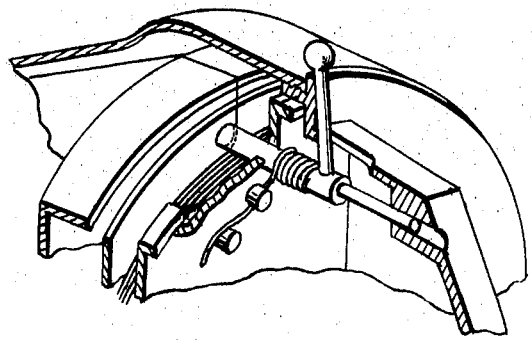
Figure 4:
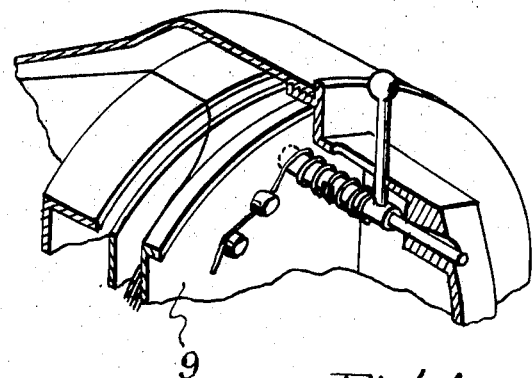
Figure 5:
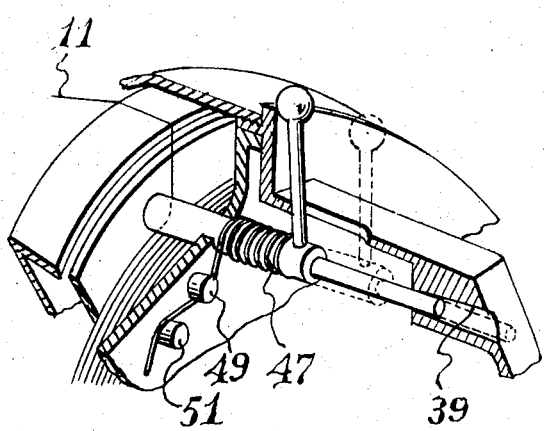
Figure 6:
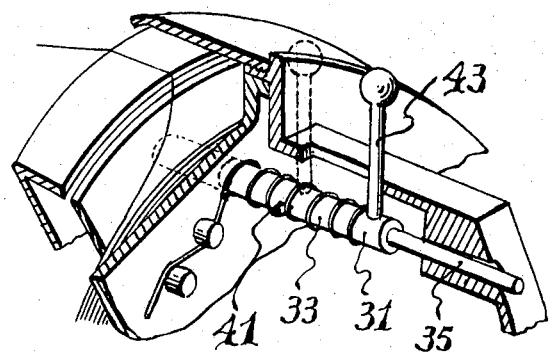

FIGS. 3 and 4 are enlarged fragmentary perspective views of the lock of the present invention and its associated structure, respectively in engaged and released positions; and FIGS. 5 and 6 are further enlarged fragmentary views of portions of FIGS. 3 and 4, respectively, illustrating the various positions of the parts.

Figure 1:
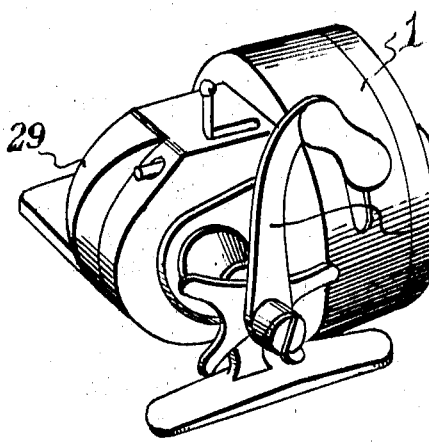
FIG. 1 is a perspective view of a reel according to the present invention.
Figure 2:
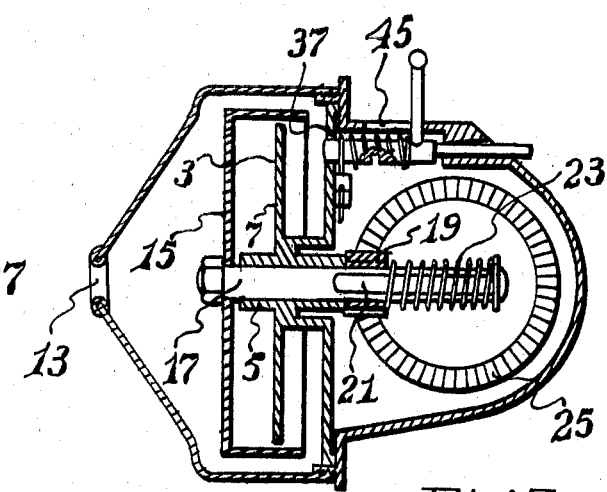
FIG. 2 is a cross-sectional view of a reel according to the present invention, with the axis of the spool lying in the plane of the figure.

Referring now to the drawing in greater detail, there is shown a fishing reel according to the present invention, which from the outside as seen in FIG. 1 appears to be generally conventional and comprises a housing 1 within which is received a stationary spool 3. Spool 3 has a stationary axial hollow hub 5 and two radial walls 7 and 9 that define the flanges between which a fishing line 11 is confined that is wound on spool 3. The wall 7 is substantially shorter, in a radial direction, than the wall 9, and the line 11 that is wound on spool 3 is thus able to pass from spool 3 out through an axial opening 13, over a rotatable pan 15. Pan 15 is secured to a rotatable shaft 17 carried in hub 5. Shaft 17 has a pinion gear 19 slidably mounted thereon by means of a flat keyway 21 in shaft 17. A coil compression spring 23 acts between pinion gear 19 and the end of shaft 17, to urge shaft 17 to the right as seen in FIG. 2 and to position pinion gear 19 against hub 5. Pinion gear 19 is in mesh with a ring gear 25 that is rotated by handle 27 to rotate shaft 17 and pan 15 thereby to pay out or retrieve line 11 according to the direction in which handle 27 is turned. A brake 29 is manually operable selectively to retard rotation of pan 15.

The structure described above is conventional. The novel structure is as follows:

A pin 31 extends parallel to shaft 17 and comprises an enlarged portion 33 and a relatively slender tail 35. Enlarged portion 33 extends through a hole 37 though wall 9, while tail 35 extends with play through a hole 39 through housing 1.

Enlarged portion 33 has a notch 41 therein that opens downwardly, that is, toward shaft 17. On its opposite side, enlarged portion 33 has a knob 43 that extends upwardly, that is, radially outwardly away from shaft 17, through a straight slot 45 through housing 1. Slot 45 is parallel to shaft 17.

A filamentary spring 47 is wound about enlarged portion 33 and acts in compression between wall 9 and knob 43 continuously to urge pin 31 toward the right as seen in FIG. 2. This portion of spring 47 functions as a coil compression spring.

The end of spring 47 which is at the left of FIG. 2, however, is extended and passes beneath a lug 49 and over a lug 51. The lugs 49 and 51 deform this end of spring 47 from a normally straight condition, so that this end of spring 47 functions as a leaf spring and acts to urge pin 31 downwardly as seen in the drawing, that is, toward shaft 17.

The operation of the reel is as follows:

With brake 29 released and the parts in the position of FIGS. 1, 2, 4 and 6, the angler is free to cast his lure and to pay out or wind in his line until the lure is at what he determines to be a desirable depth. At that time, the angler pushes on knob 43 to advance the pin 31 to the left as seen in FIG. 2, against the action of the coil compression portion of spring 47. Enlarged portion 33 of pin 31 slides through hole 37 until the left end of pin 31 contacts wall 7 and notch 41 registers with the margin of hole 37. At this point, the leaf spring portion comprised by the straight end of spring 47 urges pin 31 downwardly so that the lower margin of hole 37 snaps into notch 41 and pin 31 is thus held against retraction.

As explained above, line 11 can then be wound in, by rotation of handle 27 and hence pan 15; and successive turns of line 11 will be wound about spool 3 and will overlie pin 31. The other turns of line 11 on spool 3, that is, those which were not unwound in the first place, will all underlie pin 31.

When the angler again pays out the line, to return his lure to its previous position and depth, the turns of line 11 that overlie pin 31 will unwind until the previous position and depth of the lure is reached. The next turn of line 11, which is the first of the remaining turns that underlie pin 31, cannot unwind because pin 31 overlies it, and so the lure will be restrained at the previous or desired depth.

Should the angler desire to disable the lock provided by pin 31, he has only to pull back on knob 43, which cants pin 31 so that the margin of hole 37 moves out of notch 41. Thereupon, the coil compression portion of spring 47 urges pin 31 to the right as seen in FIG. 2, the knob 43 riding in its straight slot 45.

In addition, the lock provided by pin 31 is automatically disengaged under certain conditions, more specifically, upon an increase in tension in line 11 above a certain predetermined value. This occurs because a relatively strong pull along line 11 is sufficient to raise the pin 31 against the action of the leaf spring portion of the end of spring 47, so that the margin of hole 37 is disengaged from notch 41 and the coil compression portion of spring 47 pops pin 31 to the retracted position shown in FIG. 2.

Thus, for example, if the angler were to forget that the lock is engaged and attempt to cast to a greater distance than can be permitted by the coils of line 11 that overlie the pin 31, his cast would be aborted if the lock were to hold. But the momentum of the lure will exert a sufficient pull on line 11 to raise pin 31 when the previous length of line is exceeded, thereby automatically releasing the lock. Other excessive pulls on the line, occurring for various reasons, will also release the lock so that the unfortunate circumstances resulting from overload of a locked reel are avoided.

From a consideration of the foregoing disclosure, therefore, it will be evident that all of the initially recited objects of the present invention have been achieved.

Although the present invention has been described and illustrated in connection with a preferred embodiment, it is to be understood that modifications and variations may be resorted to without departing from the spirit of the invention, as those skilled in this art will readily understand. Such modifications and variations are considered to be within the purview and scope of the present invention as defined by the appended claims.

Having described my invention, I claim:

1. A fishing reel with a depth memory, comprising a housing, a spool within the housing to receive a quantity of fishing line wound thereon, a pin, means mounting said pin for movement relative to the spool to overlie the spool such that in an extended position of the pin a plurality of turns of line can be wound about the spool and over the pin while the turns of line beneath the pin are prevented by the pin from unwinding, while in a retracted position of the pin the line is free to wind on and unwind from the spool without hindrance from the pin, means to releasably retain said pin in extended position, and means responsive to tension in the line above a predetermined value for moving the pin from said extended to said retracted position.

2. A reel as claimed in claim 1, said spool being fixed relative to said housing and having a pair of radially extending walls between which the wound line is confined, said pin extending through a hole in one of said walls into proximity with the other of said walls when moving from said retracted to said extended position.

3. A reel as claimed in claim 2, said pin having a notch therein on the side of the pin which is adjacent the axis of the spool, said notch registering with and receiving a margin of said hole in said extended position of the pin.

4. A reel as claimed in claim 3, said means for moving the pin comprising spring means urging said pin toward said axis thereby to engage said margin in said notch.

5. A reel as claimed in claim 4, and spring means urging said pin toward said retracted position.

6. A reel as claimed in claim 5, both said spring means being portions of a single filamentary spring, the first-mentioned spring means comprising one end of said spring in the form of a leaf spring and the second-mentioned spring means comprising the other end of said spring wound about said pin in the form of a coil compression spring acting between said pin and said one wall.

7. A reel as claimed in claim 1, said means for moving the pin comprising spring means urging said pin from said extended toward said retracted position.

8. A reel as claimed in claim 1, the pin retaining means comprising a notch in said pin that registers with a fixed portion of said reel in said extended position, said means for moving the pin comprising spring means urging said notch into engagement with said fixed portion, said tension in the line above said predetermined value releasing said pin and fixed portion from said engagement.

9. A reel as claimed in claim 8, said spring means comprising a leaf spring.

10. A reel as claimed in claim 9, said leaf spring comprising one end of a coil compression spring that urges said pin from said extended to said retracted position.

* * * * *